United States Patent
Kanno et al.

(10) Patent No.: US 8,120,930 B2
(45) Date of Patent: Feb. 21, 2012

(54) RUSH CURRENT REDUCTION CIRCUIT AND ELECTRIC APPLIANCE

(75) Inventors: Shin Kanno, Musashino (JP); Mitsuo Hattori, Tokyo (JP); Mamoru Sato, Tokyo (JP); Kenji Iguchi, Osaka (JP)

(73) Assignees: NTT Advanced Technology Corporation (JP); Nippon Telegraph and Telephone Corporation (JP); Kyoshin Electric Works, Ltd. (JP)

( * ) Notice: Subject to any disclaimer, the term of this patent is extended or adjusted under 35 U.S.C. 154(b) by 470 days.

(21) Appl. No.: 12/090,697

(22) PCT Filed: Oct. 19, 2006

(86) PCT No.: PCT/JP2006/320858
§ 371 (c)(1),
(2), (4) Date: Sep. 8, 2009

(87) PCT Pub. No.: WO2007/046471
PCT Pub. Date: Apr. 26, 2007

(65) Prior Publication Data
US 2010/0046256 A1    Feb. 25, 2010

(30) Foreign Application Priority Data
Oct. 20, 2005    (JP) ................ P2005-306161

(51) Int. Cl.
H02M 3/335    (2006.01)

(52) U.S. Cl. ................ 363/17; 363/37; 307/66

(58) Field of Classification Search .............. 363/16–20, 363/37, 65, 56.01, 123, 125, 127; 307/30–36, 307/42, 64–66; 315/172, 312, 314, 250, 315/253, 307, 291
See application file for complete search history.

(56) References Cited

U.S. PATENT DOCUMENTS

| | | | | |
|---|---|---|---|---|
| 4,499,533 A | * | 2/1985 | Okamoto | 363/126 |
| 5,109,185 A | * | 4/1992 | Ball | 323/207 |
| 5,404,082 A | | 4/1995 | Hernandez et al. | |
| 5,619,127 A | | 4/1997 | Warizaya | |
| 5,886,424 A | * | 3/1999 | Kim | 307/64 |
| 6,057,652 A | * | 5/2000 | Chen et al. | 315/307 |
| 6,281,669 B1 | | 8/2001 | Brakus | |
| 6,815,843 B1 | * | 11/2004 | Kageyama | 307/42 |
| 6,853,097 B2 | * | 2/2005 | Matsuda et al. | 307/66 |
| 7,145,111 B2 | * | 12/2006 | Hori | 219/497 |

FOREIGN PATENT DOCUMENTS

JP    S51-54226    4/1976
(Continued)

OTHER PUBLICATIONS

English Translation of Office Action, Korean Patent Applicantion No. 5-2001-0070011-7, mailed Feb. 18, 2010.

*Primary Examiner* — Rajnikant Patel
(74) *Attorney, Agent, or Firm* — Kilpatrick Townsend & Stockton LLP

(57) ABSTRACT

An output node at a plus side of a diode bridge (DB2) is connected to a drain of a transistor (Q1), and a source of the transistor (Q1) is connected to an output node at a minus side the diode bridge (DB2). One end of a resister (R1) is connected to the drain of the transistor (Q1), and the other end of the resister (R1) is connected to a gate of the transistor (Q1). One end of a resister (R2) is connected to the gate of the transistor (Q1), and the other end of the resister (R2) is connected to the source of the transistor (Q1). A capacitor (C1) is connected in parallel to the resister (R2).

7 Claims, 7 Drawing Sheets

FOREIGN PATENT DOCUMENTS

| | | |
|---|---|---|
| JP | 53-66551 | 6/1978 |
| JP | S62-104529 | 7/1987 |
| JP | H03-126397 | 12/1991 |
| JP | 08-140354 | 5/1996 |
| JP | 2005-74305 A | 3/2005 |
| KR | 93-006890 B1 | 7/1993 |
| KR | 1998-084964 A | 12/1998 |
| KR | 1020050073536 A | 7/2005 |

* cited by examiner

US 8,120,930 B2

RUSH CURRENT REDUCTION CIRCUIT AND ELECTRIC APPLIANCE

CROSS REFERENCE TO RELATED APPLICATIONS

This application is the U.S. National Phase of PCT/JP2006/320858 filed on Oct. 19, 2006 which claims the benefit Japanese Application No. JP2005-306161 filed on Oct. 20, 2005.

TECHNICAL FIELD

The present invention relates to a rush current reduction circuit in which the number of circuit elements can be decreased, and an electric appliance.

BACKGROUND ART

Due to the rise of an inverter technique whose power supply use efficiency is improved, an application of the inverter technique spreads into general electric appliance. An inverter instrument realizes improved efficiency and reduction in size and weight of a power supply transformer by shifting the switching frequency to a high frequency. However, with respect to an electromagnetic noise, since a number of high level harmonics are generated accompanied with switching, it is general that power supply filters are installed for preventing electromagnetic interference to the other appliances. However, these power supply filters are designed considering only the condition that the instrument is continuously operating. It is usual that power is applied to instruments when only it is necessary to operate while the power supply is cut off to stop the operation when it is unnecessary to operate, with considering efficiency of power supply utilization or energy saving, and accordingly turning on/off of the power supply occurs more frequently than in the past.

As a technique for reducing a rush current generated when power is turned on, for instance, the Japanese Laid-Open Patent Publication No. H05-19879 discloses a technique for making current (drain current) flowing through a power supply line constant, by adjusting its gate voltage with a voltage divider while inserting a MOSFET in the power supply line.

DISCLOSURE OF THE INVENTION

In such circumstances, transient electromagnetic disturbance increases accompanied by power supply on/off, with a power supply filter circuit involved. Generation of the transient current when the power supply is turned on or cut off for the electric appliances is conventionally known; however the number of reports with respect to magnitude of the rush current of inverter instruments are very small. The rush current affects the whole of the power distribution system, and the quality of the power supply; and accordingly if the rush current is not suppressed, it becomes difficult to stably supply power.

In addition, in order to reduce AC rush current, in some cases there is used an AC rush current reduction circuit provided with both a circuit for reducing the rush current in positive direction and a circuit for reducing the rush current in negative direction.

Since such a rush current reduction circuit requires the same two circuits, the number of the circuit elements tends to increase. In addition, it is necessary for respective circuits to be provided with expensive power MOSFET or power transistors; and therefore the rush current reduction circuit tends to become expensive.

The present invention is achieved in consideration of the above described problem and its object is to provide a rush current reduction circuit and electric appliance capable of reducing the number of circuit elements.

In order to resolve the above described problems, a first aspect of the present invention provides a rush current reduction circuit comprising: a diode bridge inserted into an AC circuit into which a load circuit is inserted; and a DC rush current reduction circuit inserted into a circuit through which current flows from the diode bridge, wherein the DC rush current reduction circuit comprises: a transistor inserted into a circuit through which current flows from the diode bridge; a capacitor connected to a bias control point of the transistor and charged by the current from the diode bridge to cause bias voltage which is voltage of the bias control point to increase; a resister connected in parallel to the capacitor; and a resistor inserted into a path for charging the capacitor.

A second aspect of the present invention provides a rush current reduction circuit comprising: a diode bridge inserted into an AC circuit when a load circuit is connected to subsequent stages of a diode bridge inserted into the AC circuit; and a DC rush current reduction circuit inserted into a circuit through which current flows from the diode bridge, wherein the DC rush current reduction circuit comprises: a transistor inserted into a circuit through which current flows from the diode bridge; a capacitor connected to a bias control point of the transistor and charged by the current from the diode bridge to cause bias voltage which is voltage of the bias control point to increase; a resister connected in parallel to the capacitor; and a resistor inserted into a path for charging the capacitor.

A third aspect of the present invention, which is the rush current reduction circuit according to the second aspect, provides a control circuit inserted between a first circuit node existing on subsequent stages of a diode bridge to which the load circuit is connected and a second circuit node existing on the DC rush current reduction circuit.

A fourth aspect of the present invention is the rush current reduction circuit according to the third aspect, here, in which the control circuit is provided with a diode for preventing reverse current to the first circuit node.

A fifth aspect of the present invention provides an electric appliance provided with the rush current reduction circuit and the load circuit in any one of the first to the fourth aspects.

A sixth aspect of the present invention which is an electric appliance according to the fifth aspect, is provided with a drive unit in which power is supplied from an inverter to be the load circuit.

A seventh aspect of the present invention which is the electric appliance according to the fifth aspect, is provided with a light source in which power is supplied from the inverter to be the load circuit.

According to the present invention, it is possible to reduce the number of the circuit elements, by inserting the DC rush current reduction circuit into the circuit through which current flows from the diode bridge, compared with a case where the AC rush current reduction circuit is inserted into the AC circuit.

BEST MODES FOR CARRYING OUT THE INVENTION

Figure 1:
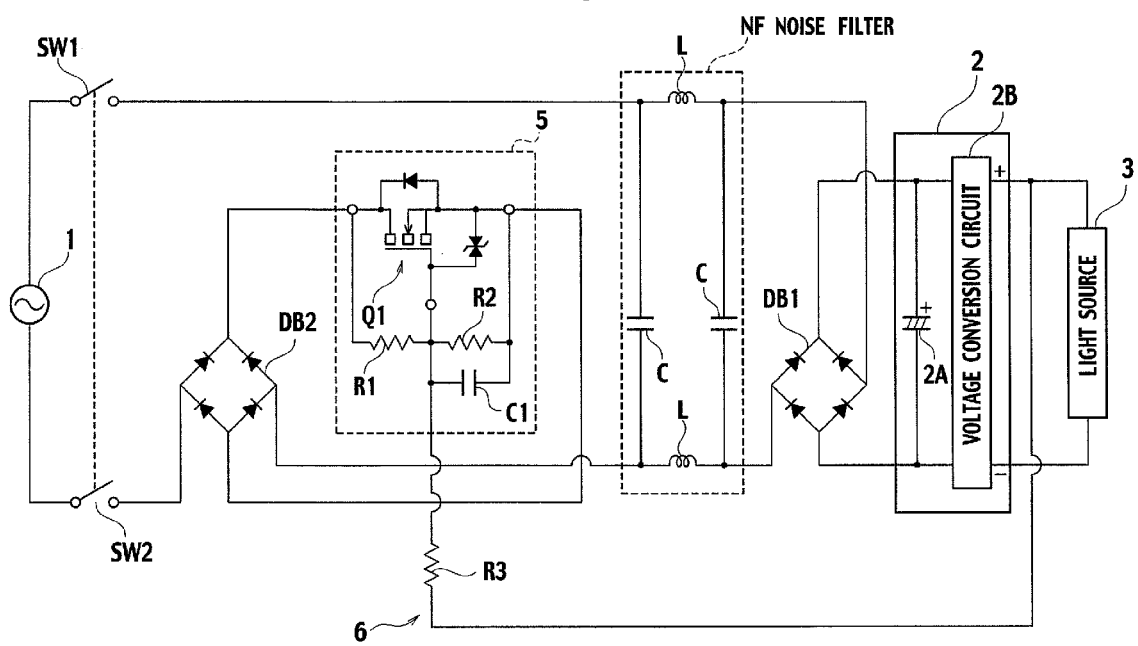
FIG. 1 is a circuit diagram of an electric appliance using a rush current reduction circuit according to a first embodiment.

There will be described embodiments of the present invention referring to the drawings below.

First Embodiment

FIG. 1 is a circuit diagram of an electric appliance using a rush current reduction circuit according to a first embodiment.

This electric appliance is used together with a single phase AC power supply 1, and is provided with an inverter 2 to which power is supplied by this AC power supply 1, that is, which becomes a load circuit for the AC power supply 1. In addition, the electric appliance is further provided with, for instance, a light source 3 to which power is supplied by the inverter 2.

One pole of the AC power supply 1 is connected to one AC input node of a diode bridge DB1 via one switch SW1 of a double-pole switch and one inductance L constituting a noise filter NF. On the other hand, the other AC input node of the diode bridge DB1 is connected to one AC input node of a diode bridge DB2 via the other inductance L constituting the noise filter NF. The other AC input node of the diode bridge DB2 is connected to the other pole of the AC power supply 1 via the other switch SW2 of the double-pole switch. In the noise filter NF, capacitors C are connected between the input nodes and between output nodes.

An output node (pulsating current output node) at a plus side of the diode bridge DB2 is connected to a drain of a transistor Q1 to be an N-channel MOSFET (field effect transistor); and a source of the transistor Q1 is connected to an output node at a minus side of the diode bridge DB2. In other words, the output contact point of the diode bridge DB2 is connected between the source/drain of the transistor Q1 in parallel. One end of a resister R1 is connected to the drain of the transistor Q1, and the other end of the resister R1 is connected to a gate of the transistor Q1. One end of a resister R2 is connected to the gate of the transistor Q1, and the other end of the resister R2 is connected to the source of the transistor Q1. The capacitor C1 is connected to the resister R2 in parallel.

A circuit comprised of these transistor Q1, resisters R1, R2 and capacitor C1 constitutes a DC rush current reduction circuit 5 in the present embodiment. That is, the DC rush current reduction circuit 5 is constituted from the transistor Q1 of which the drain is connected to the output contact point at the plus side of the diode bridge DB2, the resister R1 connected between the drain/gate of the transistor Q1, the resister R2 connected between the source/drain of the transistor Q1, and the capacitor C1 connected in parallel to the resister R2. In addition, the DC rush current reduction circuit 5 is connected between the AC power supply 1 and the noise filter NF.

Meanwhile, AC voltage output from the AC power supply 1 is applied between AC input contact points of the diode bridge DB2 via the noise filter NF.

The output node at the plus side of the diode bridge DB1 is connected to the input node at the plus side of an inverter 2, and the output node at the minus side of the diode bridge DB1 is connected to the input node at the minus side of the inverter 2.

In the inverter 2, an electrolytic capacitor 2A having relatively large capacitance is connected between the input nodes, and the respective input nodes are connected to respective input nodes of a voltage conversion circuit 2B.

One end of a resister R3 is connected to the output node at a plus side of the voltage conversion circuit 2B, and the other end of the resister R3 is connected to the gate of the transistor Q1. A circuit from the output node at the plus side of the voltage conversion circuit 2B to the gate of the transistor Q1 constitutes a control circuit 6 of the present embodiment.

The output node at the minus side of the voltage conversion circuit 2B, not illustrated in the drawing, is connected to the input node at the minus side of the voltage conversion circuit 2B, and further, the light source 3 is connected between the output node at the minus side and the output node at the plus side of the conversion circuit 2B.

Operation of First Embodiment

In cases where voltage of a pole at the switch SW1 side of the AC power supply 1 is higher than voltage of the other pole and the double-pole switch is turned on from off, high frequency rush current tends to flow toward the capacitor C of the noise filter NF, and thereafter low frequency rush current tends to flow toward the electrolytic capacitor 2A of the inverter 2. At this time, since the transistor Q1 is off and the resister R1 and the resister R2 have relatively large resistance values, although current flowing through the DC rush current reduction circuit 5 is small, this current starts to charge the capacitor C1 via the diode bridge DB2 and the resister R1 from the AC power supply 1.

At the initial stage of the charging, since the potential difference between both ends of the capacitor C1 is small and also the gate voltage of the transistor Q1 is low, the transistor Q1 is cut off.

Then charging of the capacitor C1 is continued and current flowing through the transistor Q1 increases gradually as the gate voltage of the transistor Q1 increases gradually. That is, current starts to flow between the source/drain of the transistor Q1 while the current being delayed from the time the double-pole switch turns ON, depending on a time constant determined by the resister R1, the resister R2 and the capacitor C1, and thereafter the current becomes large progressively. At that moment, since the capacitor C of the noise filter NF and the electrolytic capacitor 2A of the inverter 2 are charged more than a little, and thereafter, when the respective current (high frequency rush current) flowing through the capacitor C of the noise filter NF and current (low frequency rush current) flowing through the electrolytic capacitor 2A of the inverter 2 become maximum, the respective maximum current values result in lower values than values of the case where the transistor Q1 is not provided. That is, it is possible to reduce the rush current.

In cases where voltage of a pole at the switch SW2 side of the AC power supply 1 is higher and the double-pole switch turns ON, high frequency rush current tends to flow toward the capacitor C of the noise filter NF, and thereafter low frequency rush current tends to flow toward the electrolytic capacitor 2A of the inverter 2. At this time, since the transistor Q1 is off and the resister R1 and the resister R2 have relatively large resistance values, although current flowing through the DC rush current reduction circuit 5 is small, this current starts to charge the capacitor C1 via the diode bridge DB2 and the resister R1 from the AC power supply 1.

At the initial stage of the charging, since the potential difference between both ends of the capacitor C1 is small and also the gate voltage of the transistor Q1 is low, the transistor Q1 is cut off.

Then, charging of the capacitor C1 is continued and current flowing through the transistor Q1 increases gradually as the gate voltage of the transistor Q1 increases gradually. That is, current starts to flow between the source/drain of the transistor Q1 while the current being delayed from the time the double-pole switch turns ON, depending on a time constant determined by the resister R1, the resister R2 and the capacitor C1, and thereafter the current becomes large progressively. At that moment, since the capacitor C of the noise filter NF and the electrolytic capacitor 2A of the inverter 2 are charged more than a little, and thereafter, when the respective current (high frequency rush current) flowing through the capacitor C of the noise filter NF and current (low frequency rush current) flowing through the electrolytic capacitor 2A of the inverter 2 become maximum, the respective maximum current values result in lower values than values of the case where the transistor Q1 is not provided. That is, it is possible to reduce the rush current.

In cases where the electrolytic capacitor 2A is charged by the current even though the maximum value is low, and thereby voltage is applied between the input nodes of the voltage conversion circuit 2B, the voltage conversion circuit 2B steps up or down the voltage, and causes the light source 3 to emit light by applying the voltage.

Meanwhile, in both of the phase period where voltage of a pole at the switch SW1 side is high and the phase period where voltage of a pole at the switch SW2 side is high, of the AC power supply 1, it is desirable that the voltage between the drain/source of the transistor Q1 is made sufficiently small, and power loss in the transistor Q1 is made small.

Specifically, the resistance values of the resister R1 and the resister R2 may be set such that the gate voltage becomes sufficiently high, and further, the electric capacitance of the capacitor C1 and the resistance values of the resister R1 and the resister R2 may be set such that the capacitor C1 is not discharged.

However, by only such setting, when drain current of the transistor Q1 is not large enough, in some cases, the voltage between the drain/source and the power loss therein are not small enough.

At this time, the gate voltage of the transistor Q1 is lowered with the charge of the capacitor C1 discharged.

In this electric appliance, upon connecting the output node at the plus side of the voltage conversion circuit 2B to the gate of the transistor Q1 via a resister R3, discharge of the capacitor C1 is prevented, and thereby, since the gate voltage of the transistor Q1 can be kept high, it is possible to prevent increase of voltage between drain/source and increase of power loss.

Figure 2:
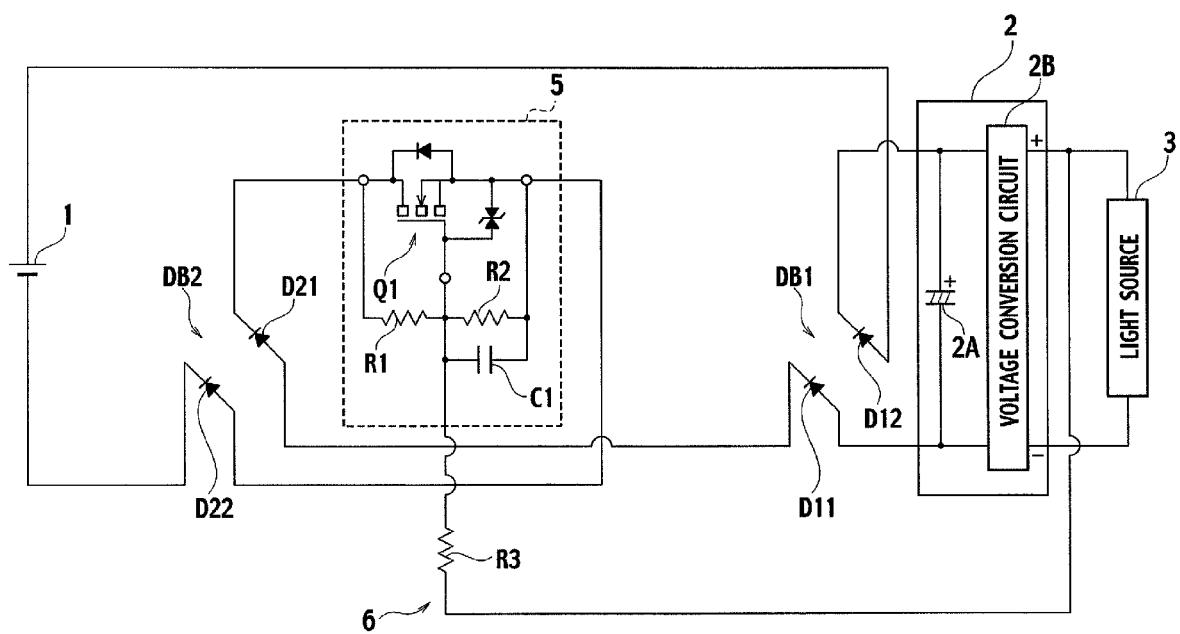
FIG. 2 is an equivalent circuit diagram in cases where voltage of a pole at a switch SW1 side of an AC power supply 1 is high in the first embodiment.
Figure 3:
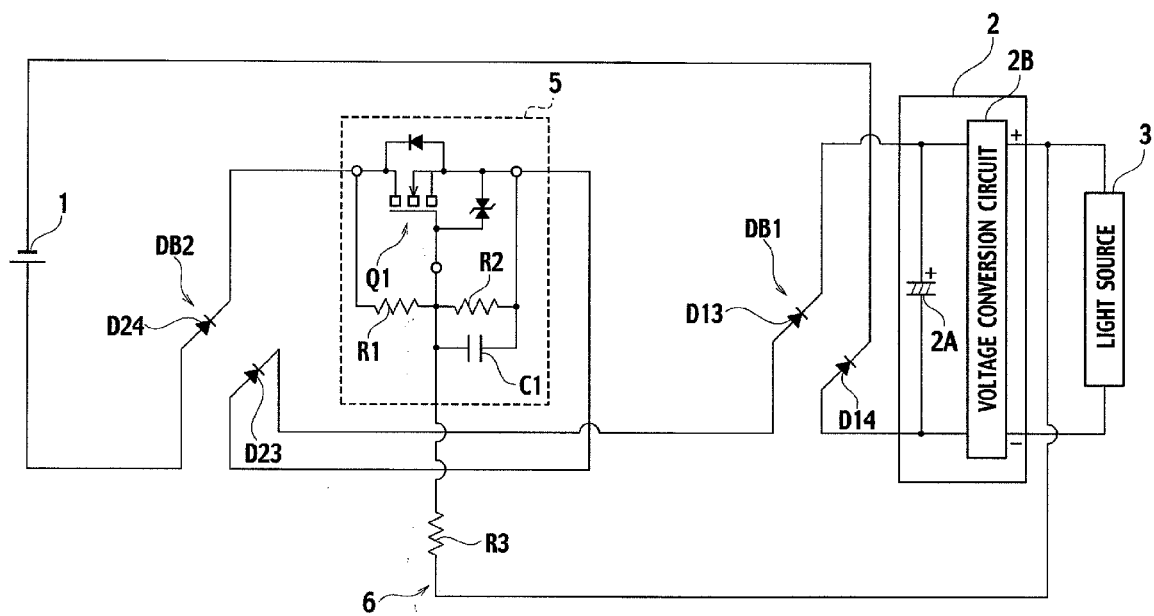
FIG. 3 is an equivalent circuit diagram in cases where voltage in a pole at a switch SW2 side of the AC power supply 1 is high in the first embodiment.

FIG. 2 is an equivalent circuit diagram of a case where voltage of a pole at the switch SW1 side of the AC power supply 1 is higher; and FIG. 3 is an equivalent circuit diagram of a case where voltage of a pole at the switch SW2 side of the AC power supply 1 is higher. In these drawings, the AC power supply 1 is shown with a symbol of a DC power supply. Further, the double-pole switch is omitted as the switches SW1 and SW2 of the double-pole switch are turned ON. In addition, the noise filter NF is omitted. In addition, with respect to the diode bridges DB1 and DB2, there are indicated only diodes electrically conducted.

As shown in FIG. 2, in cases where voltage of a pole at the switch SW1 side is high, in the diode bridge DB1, a diode D11 connected between the output node at its plus side and an AC input node at the diode bridge DB2 side is electrically conducted. Further, in the diode bridge DB2, a diode D12 connected between an output node at its minus side and an AC input node of the other is electrically conducted.

In addition, in the diode bridge DB2, a diode D21 connected between an output node at its plus side and an AC input node at the diode bridge DB2 side is electrically conducted. Further, in the diode bridge DB2, a diode D22 connected between an output node at its minus side and an AC input node of the other is electrically conducted.

Accordingly, independent of the magnitude of the potential difference between the output nodes of the voltage conversion circuit 2B, the potential of the output node at the plus side of the voltage conversion circuit 2B is higher than that of the gate of the transistor Q1. Therefore, the charge of the capacitor C1 is not discharged toward the output node at the plus side of the voltage conversion circuit 2B.

On the other hand, as shown in FIG. 3, in cases where voltage of a pole at the switch SW2 side is higher, in the diode bridge DB1, a diode D13 connected between an output node at its plus side and an AC input node at the diode bridge DB2 side is electrically conducted. Further, in the diode bridge DB1, a diode D14 connected between an output node at its minus side and an AC input node of the other is electrically conducted.

In addition, in the diode bridge DB2, a diode D23 connected between the output node at its plus side and the AC input node at the diode bridge DB1 side is electrically conducted. Further, in the diode bridge DB2, a diode D24 connected between the output node at its minus side and the AC input node of the other is electrically conducted.

Accordingly, in cases where potential difference between the output nodes of the voltage conversion circuit 2B is small, in some cases, the potential of the output node of the plus side of the voltage conversion circuit 2B is lower than that of the gate of the transistor Q1. For instance, in cases where the light source 3 includes elements which emit light at a lower voltage like an LED (light-emitting diode), since the voltage difference between the output nodes of the voltage conversion circuit 2B is small, in some cases, the potential of the output node at the plus side of the voltage conversion circuit 2B becomes lower than the potential of the gate of the transistor Q1.

As a result, the charge of the capacitor C1 is discharged toward the output node at the plus side of the voltage conversion circuit 2B; it is not possible to keep the gate voltage of the transistor Q1 high. For that reason, the electric appliance exerts effects, when, for instance, the light source 3 includes elements which emit light with high voltage like a fluorescent tube and the potential difference between the output nodes of the voltage conversion circuit 2B is large.

As described above, according to the first embodiment, by inserting the DC rush current reduction circuit 5 into the circuit through which current flows from the diode bridge DB2, it is possible to reduce (approximately be reduced by half) the number of the circuit elements, compared with the case where the AC rush current reduction circuit constituted in such a way as to oppositely connect the aforementioned DC rush current reduction circuit 5 is inserted into the circuit from one pole to the other pole of the AC circuit, that is, the AC power supply 1. In particular, it is possible to reduce the number of the expensive transistors by half. Therefore, downsizing of the rush current reduction circuit or the electric appliance becomes possible, and it becomes also possible to incorporate them into small housing.

Meanwhile, in the first embodiment, although the diode bridge DB2 is inserted into the AC circuit when the inverter 2 (load circuit) is connected to subsequent stages of the diode bridge DB1 inserted into the AC circuit, and the DC rush current reduction circuit 5 is inserted into the circuit through which current flows from the diode bridge DB2, for instance, the DC rush current reduction circuit 5 may be inserted into the circuit through which current flows from the diode bridge DB2; while inserting the diode bridge DB2 into the AC circuit into which the load circuit such as AC motor is inserted, is also effective.

In addition, according to the first embodiment, since there is provided the control circuit 6 (the circuit from the output node at the plus side of the voltage conversion circuit 2B to the gate of the transistor Q1) from a first circuit node existing in subsequent stages of the diode bridge DB1 to a second circuit node existing in the DC rush current reduction circuit 5, the first embodiment is preferable for the cases where the potential difference between the output nodes of the voltage conversion circuit 2B is large.

Second Embodiment

Figure 4:
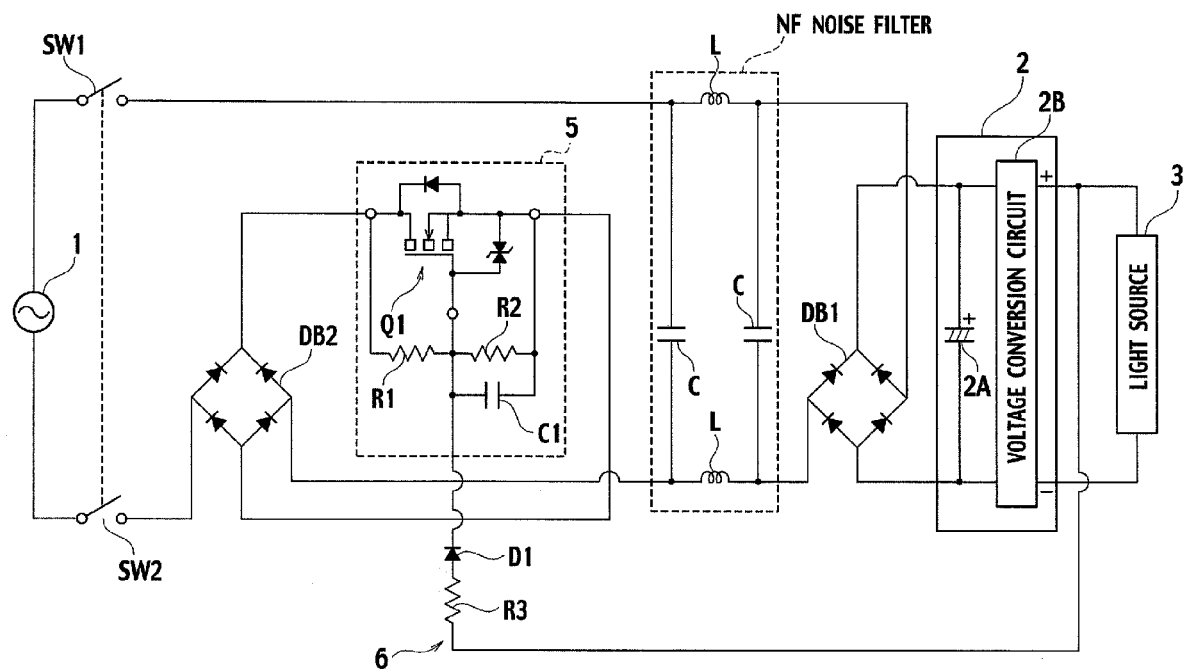
FIG. 4 is a circuit diagram of the electric appliance using a rush current reduction circuit according to a second embodiment.

FIG. 4 is a circuit diagram of the electric appliance using the rush current reduction circuit 5 according to the second embodiment.

As shown in FIG. 4, almost all of the electric appliance is the same as the electric appliance shown in FIG. 1. Its difference lies only in that one end of the resister R3 not connected to the output node at the plus side of the voltage conversion circuit 2B is connected to an anode of the diode D1, and a cathode of the diode D1 is connected to the gate of the transistor Q1.

In this electric appliance, as shown in FIG. 2, when voltage of the pole at the switch SW1 side is higher, in the diode bridge DB1, the diode D11 and the diode D12 are electrically conducted. Further, in the diode bridge DB2, the diode D21 and the diode D22 are electrically conducted.

Whereby, independent of the magnitude of the potential difference between the output nodes of the voltage conversion circuit 2B, the potential of the output node at the plus side of the voltage conversion circuit 2B becomes higher than that of the gate of the transistor Q1. Therefore, the charge of the capacitor C1 is not discharged toward the output node at the plus side of the voltage conversion circuit 2B.

Figure 5:
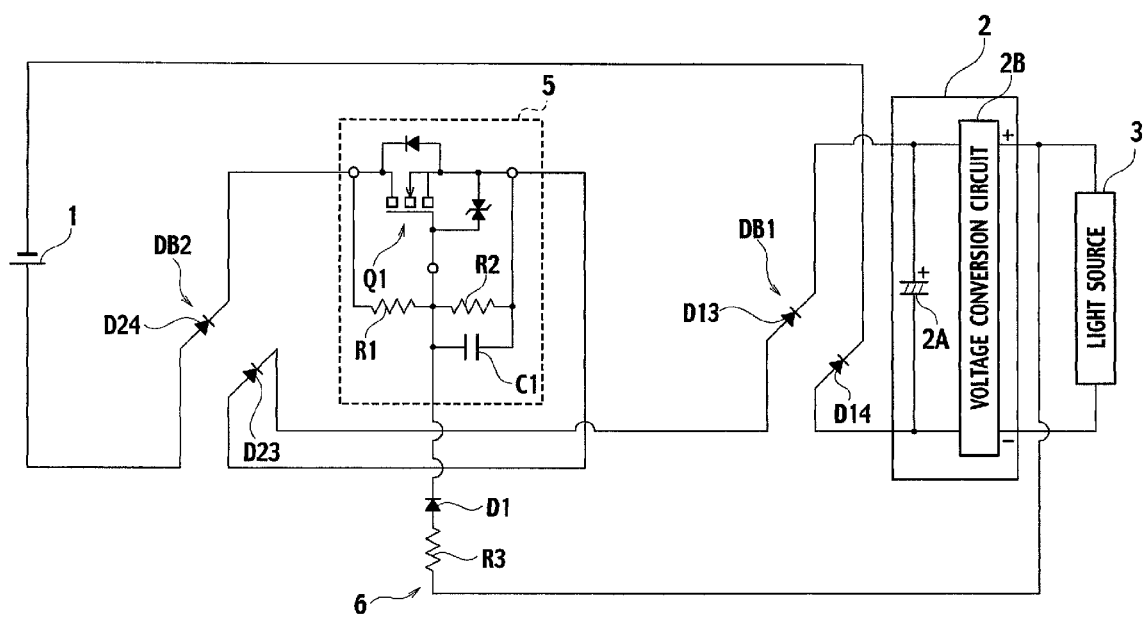
FIG. 5 is an equivalent circuit diagram in cases where voltage of a pole at a switch SW2 side of an AC power supply 1 is high in the second embodiment.

FIG. 5 is an equivalent circuit diagram of a case where voltage of a pole at the switch SW2 side of the AC power supply 1 is higher. In the drawing, the AC power supply 1 is shown with a symbol of a DC power supply. In addition, the switches SW1 and SW2 of the double-pole switch are omitted as the switches SW1 and SW2 of the double-pole switch are turned ON. Also, the noise filter NF is omitted. In addition, in the diode bridges DB1 and DB2, there are indicated only diodes electrically conducted.

As shown in FIG. 5, when voltage of the pole at the switch SW2 side is higher, in the diode bridge DB1, the diode D13 and the diode D14 are conducted. Also, in the diode bridge DB2, the diode D23 and the diode D24 are electrically conducted.

Whereby, in some cases, the potential of the output node at the plus side of the voltage conversion circuit 2B is lower than that of the gate of the transistor Q1.

However, due to the diode D1, the charge of the capacitor C1 is not discharged toward the output node at the plus side of the voltage conversion circuit 2B. Therefore, it is needless to say that the electric appliance according to the second embodiment is used in cases where the light source 3 includes elements which emit light with high voltage like a fluorescent tube and the potential difference between the output nodes of the voltage conversion circuit 2B is large, and further, the electric appliance according to the second embodiment is also used in cases where the light source 3 includes elements which emit light with low voltage like an LED and the potential difference between the output nodes of the voltage conversion circuit 2B is small.

As described above, according to the second embodiment, the control circuit 6 (circuit from the output node at the plus side of the voltage conversion circuit 2B to the gate of the transistor Q1) is preferable even the case where the potential difference between the output nodes of the voltage conversion circuit 2B is small, because there is provided the diode D1 for preventing reverse current toward the first circuit node (output node at the plus side of the voltage conversion circuit 2B).

Figure 6:
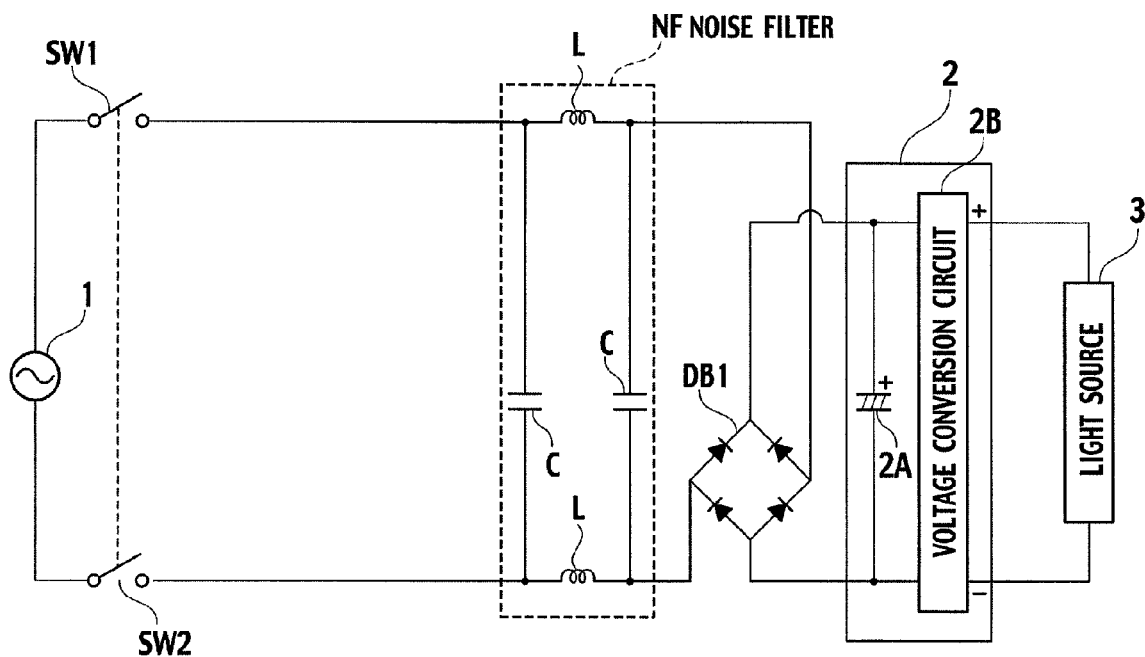
FIG. 6 is an electric circuit diagram of a comparative example used for examining effects of the electric appliance according to an embodiment of the present invention.

Next, there will be described effects exerted by the electric appliance according to the second embodiment. First, there will be described a circuit as a comparative example used for examining that effect. As shown in FIG. 6, the circuit of the comparative example has the AC power supply 1, the switches SW1 and SW2 constituting double-pole switch provided respectively to both poles of the AC power supply, the noise filter NF connected in parallel to the switches SW1 and SW2, the diode bridge DB1 whose input node is connected in parallel to the output node of the noise filter NF, and the inverter 2 connected in parallel to the output contact point of the diode bridge DB1. The inverter 2 has the voltage conversion circuit 2B and the electrolytic capacitor 2A connected in parallel to the input node of the voltage conversion circuit 2B. At the output side of the inverter 2, the light source 3 to which the electric power is supplied from the inverter 2 is provided. That is, in comparison with the electric appliance according to the second embodiment, the circuit of the comparative example differs in that the circuit of the comparative example is not provided with the diode bridge DB2, the rush current reduction circuit 5, and the control circuit 6; and with respect to the other points, both circuits are in common.

Figure 7A:
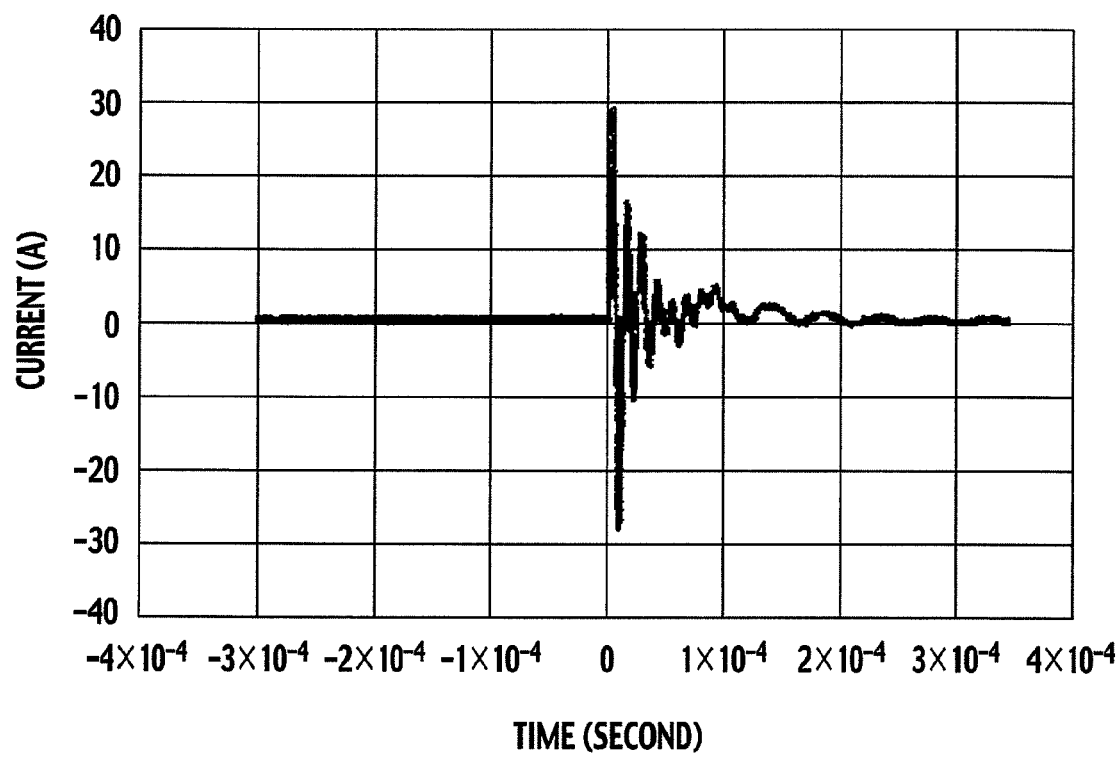
FIG. 7A is a diagram showing magnitude and change of the rush current measured in the circuit of the comparative example of FIG. 6.

FIG. 7A shows variation of the current measured with a current measurement device inserted between the AC power supply 1 and the switch SW1 of the circuit of the comparative example described above. A horizontal axis denotes time. As shown in the drawing, when the switches SW1 and SW2 are turned ON in the original point (zero), it is found that the rush current of approximately 30 A flows, subsequently, this current flows pulsatively and decreases. In addition, this pulsation continues during approximately $3.5 \times 10^{-4}$ sec. That is, in the circuit of the comparative example, the rush current with maximum amplitude of 60 A (+/−30 A) is generated, and it is found that approximately $3.5 \times 10^{-4}$ seq is necessary for sufficient attenuation of the rush current.

Figure 7B:
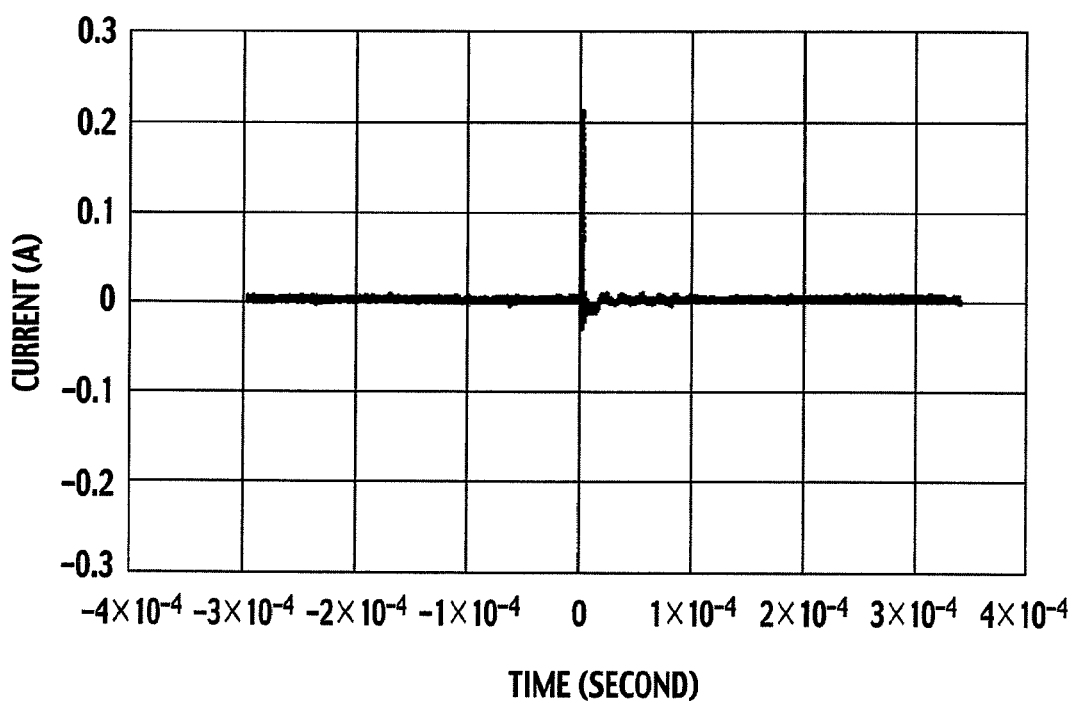
FIG. 7B is a diagram showing magnitude and change of the rush current measured in the electric appliance according to the embodiment of the present invention.

Compared with this, in cases where current in the electric appliance according to the second embodiment is measured by the same measuring method as the circuit of the comparative example, as shown in FIG. 7B, it is found that the rush current after the switches SW1 and SW2 are turned ON is only approximately 0.2 A. In addition, with respect to pulsation of the rush current, it disappears after only approximately $1 \times 10^{-4}$ sec. From the above, the effect in the second embodiment of the present invention is recognized. Meanwhile, the electric circuit according to the first embodiment has the same configuration as that of the electric appliance according to the second embodiment except for the point that there is not the diode D1 in the control circuit 6, and therefore, it is apparent that the same effect is exerted.

Meanwhile, in these embodiments, if the power loss in the transistor Q1 can be allowed, the control circuit 6 may not be provided. In addition, in the first and second embodiments, the control circuit 6 is provided between the output node at the plus side of the voltage conversion circuit 2B and the gate of the transistor Q1; however, instead of this, the control circuit 6 may be provided between the node at the plus side of the electrolytic capacitor 2A and the gate of the transistor Q1. This configuration is applied to the case where lighting instruments emit light with alternating current, such as fluorescent tubes, are used as the light source 3. In addition, even the case where the control circuit 6 is connected to the node at the plus side of the electrolytic capacitor 2A, like the case where the control circuit 6 is connected to the output node at the plus side of the voltage conversion circuit 2B, effect of preventing discharging of the capacitor C1 is exerted. Meanwhile, a graph shown in FIG. 7B is a result of the case where the control circuit 6 is provided between the node at the plus side of the electrolytic capacitor 2A and the gate of the transistor Q1.

Also, in cases where plural units of electric appliances are connected to the AC power supply with the same switch, extremely large rush current is generated; however, by applying the present invention to the respective electric appliances, it is possible to extremely lower the rush current.

In addition, the electric appliances of these embodiments may be ones which are provided with a drive unit instead of the light source 3. In this electric appliance, when the voltage is applied between the input nodes of the voltage conversion circuit 2B, the voltage conversion circuit 2B sets up or down the voltage, and then the voltage conversion circuit 2B applies the voltage to the drive unit to drive the drive unit. The operations other than this are the same as those of the above. Therefore, it is possible to reduce the number of circuit elements of the electric appliance provided with the drive unit.

In addition, since it is possible to prevent electromagnetic interference during operation by providing the noise filter NF, it is possible to maintain condition with less electromagnetic interference in the both states where the power is turned ON and during operation.

Further, the N channel MOSFET is used; however, also an NPN bipolar transistor may be used. Also, P channel MOSFET or PNP bipolar transistor may be used. In addition, the double-pole switch is used in these embodiments; however, a single-pole switch may be used.

INDUSTRIAL APPLICABILITY

By the rush current reduction circuit according to the present invention, it is possible to prevent the electromagnetic interferences generated not only at a continuous operation of general electric appliance in which inverter technique is applied but also at the time of activation. Consequently, in various industrial fields, through reduction of adverse effect for the other electric appliance, there is prevented malfunction, and thus contributing to improvement of safety.

The invention claimed is:

1. A rush current reduction circuit comprising:
a diode bridge inserted into an AC circuit into which a load circuit is inserted; and
a DC rush current reduction circuit inserted into a circuit through which current flows from the diode bridge,
wherein the DC rush current reduction circuit comprises:
a transistor inserted into a circuit through which current flows from the diode bridge;
a capacitor connected to a bias control point of the transistor and charged by the current from the diode bridge to cause bias voltage which is voltage of the bias control point to increase;
a resister connected in parallel to the capacitor; and
a resistor inserted into a path for charging the capacitor.

2. A rush current reduction circuit comprising:
a diode bridge inserted into an AC circuit when a load circuit is connected to subsequent stages of a diode bridge inserted into the AC circuit; and
a DC rush current reduction circuit inserted into a circuit through which current flows from this diode bridge,
wherein the DC rush current reduction circuit comprises:
a transistor inserted into a circuit through which current flows from the diode bridge;
a capacitor connected to a bias control point of the transistor and charged by the current from the diode bridge to cause bias voltage which is voltage of the bias control point to increase;
a resister connected in parallel to the capacitor; and
a resistor inserted into a path for charging the capacitor.

3. The rush current reduction circuit according to claim 2, further comprising:
a control circuit inserted between a first circuit node existing on subsequent stages of the diode bridge to which the load circuit is connected and a second circuit node existing on the DC rush current reduction circuit.

4. The rush current reduction circuit according to claim 3, wherein the control circuit is provided with a diode for preventing reverse current toward the first circuit node.

5. An electric appliance comprising:
a rush current reduction circuit described in any one of claims 1 to 4; and
the load circuit.

6. The electric appliance according to claim 5, wherein there is provided a drive unit to which electric power is supplied from an inverter to be the load circuit.

7. The electric appliance according to claim 5, wherein there is provided a light source to which electric power is supplied from an inverter to be the load circuit.

* * * * *